(12) United States Patent
Cassidy et al.

(10) Patent No.: US 6,375,279 B1
(45) Date of Patent: Apr. 23, 2002

(54) HYDRAULIC CONTROL UNIT WITH FLUID COMPENSATOR TO ACCOMMODATE TRAVEL OF MASTER CYLINDER PISTON

(75) Inventors: John M. Cassidy, Farmington Hills; Jeffrey King, Livonia; Patrick J. Tardiff, Allen Park; Gary R. Knight, Woodhaven; Ronald L. Sorensen, Erie, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/629,330

(22) Filed: Aug. 1, 2000

Related U.S. Application Data

(63) Continuation of application No. PCT/US99/02256, filed on Feb. 2, 1999.

(51) Int. Cl.[7] .............................. B60T 17/04; B60T 8/40
(52) U.S. Cl. ............... 303/116.1; 303/87; 303/DIG. 10; 303/DIG. 11
(58) Field of Search ...................... 303/87, DIG. 10, 303/DIG. 11, 116.1, 115.1, 117.1; 60/413, 415

(56) References Cited

U.S. PATENT DOCUMENTS

| | | | |
|---|---|---|---|
| 3,140,124 A | | 7/1964 | Heiland |
| 3,985,063 A | * | 10/1976 | Lemon .......................... 60/413 |
| 4,217,758 A | * | 8/1980 | Bach et al. .................... 60/413 |
| 4,320,623 A | * | 3/1982 | Farr .............................. 60/551 |
| 4,492,413 A | * | 1/1985 | Belart et al. .............. 303/119.1 |
| 4,725,103 A | * | 2/1988 | Watanabe ................. 303/119.1 |
| 4,867,294 A | * | 9/1989 | de Tuesta ................. 192/109 F |
| 5,025,823 A | * | 6/1991 | Stevenson .............. 137/505.18 |
| 5,035,469 A | | 7/1991 | Geilen et al. |
| 5,096,400 A | | 3/1992 | Budecker et al. |
| 5,209,554 A | | 5/1993 | Beilfuss et al. |
| 5,288,142 A | * | 2/1994 | Burgdorf .................. 303/113.2 |
| 5,312,174 A | | 5/1994 | Beilfuss et al. |
| 5,460,438 A | * | 10/1995 | Hellmann et al. ............. 303/87 |
| 5,577,813 A | * | 11/1996 | Zaviska .................... 303/116.4 |
| 5,584,539 A | * | 12/1996 | Hashida ................... 303/116.2 |
| 5,911,484 A | * | 6/1999 | Hashida ................... 303/115.4 |
| 5,927,828 A | * | 7/1999 | Beck ........................ 303/116.2 |

FOREIGN PATENT DOCUMENTS

| | | |
|---|---|---|
| DE | 40 39 088 | 6/1992 |
| EP | 01106759 | 4/1989 |
| EP | 0 491 159 | 6/1992 |
| EP | 10024824 | 1/1998 |
| GB | 2 036 022 | 6/1980 |

* cited by examiner

*Primary Examiner*—Christopher P. Schwartz
*Assistant Examiner*—Robert A. Siconolfi
(74) *Attorney, Agent, or Firm*—MacMillan, Sobanski & Todd, LLC

(57) ABSTRACT

A fluid compensator is provided in a hydraulic control unit of vehicular brake system. The fluid compensator permits additional displacement of a master cylinder piston during anti-lock braking events only by storing fluid in the hydraulic control unit. The additional displacement moves a seal mounted on the master cylinder piston away from a compensator port orifice, thereby preventing repeated "nibbling" of the seal which can cause premature seal failure.

13 Claims, 4 Drawing Sheets

HYDRAULIC CONTROL UNIT WITH FLUID COMPENSATOR TO ACCOMMODATE TRAVEL OF MASTER CYLINDER PISTON

This application is a continuation of PCT/U.S. 99/02256 filed Feb. 2, 1999.

BACKGROUND OF THE INVENTION

This invention relates in general to vehicular brake systems, and in particular is concerned with a fluid compensator provided in a hydraulic control unit to accommodate travel of a master cylinder piston.

Hydraulic braking systems for vehicles are well known- A typical hydraulic brake system includes a master cylinder, fluid conduit arranged into a desired circuit and wheel brakes. The master cylinder generates hydraulic forces in the fluid circuit by pressurizing brake fluid when the driver steps on the brake pedal. A piston in the master cylinder travels in response to the brake pedal. The pressurized fluid travels through the fluid conduit in the circuit to actuate brake cylinders at the wheel brakes and slow the vehicle.

Anti-lock braking systems (ABS) for vehicles are also well known hydraulic systems. A hydraulic control unit (HCU) or housing, containing control valves and other components such as control valves and pumps, is located between the master cylinder and the wheel brake assemblies. Through an electronic controller, the control valves and other components selectively control pressure to the wheel brake assemblies to provide a desired braking response of the vehicle.

A seal is provided about the master cylinder piston. Preferably, this seal is formed as a one-way seal commonly known as a lip seal. During a braking event, this seal can be positioned nearby a compensation port orifice of the master cylinder. Repeated passes of a seal holding pressurized fluid across the compensation port orifice as the master cylinder piston is stroked can result in deterioration of the seal and shortened effective life of the seal. Known braking systems can provide additional displacement of the master cylinder piston to move the seal away from the compensation port orifice, but such systems add extra pedal stroke to every braking event, i.e., normal (base) braking as well as anti-lock braking. Additional pedal stroke is generally not desired in many-brake systems.

SUMMARY OF THE INVENTION

This invention includes a fluid compensator provided in a hydraulic control unit of vehicular brake systems. The fluid compensator permits additional displacement of a master cylinder piston during anti-lock braking events only by storing fluid in the hydraulic control unit. The additional displacement moves a seal mounted on the master cylinder piston away from a orifice, thereby preventing repeated "nibbling" of the seal compensator port which can cause premature seal failure. One advantage provided by this fluid compensator is that additional pedal stroke is not present during normal base braking, since this fluid compensator has no effect during normal braking. The fluid compensator is provided in a hydraulic control unit and can be used with many variations of anti-lock brake systems.

In a first preferred embodiment, a fluid compensator to accommodate piston displacement of a master cylinder in a vehicular brake system includes a body formed from a resilient material having a gas trapped in pores. The body includes a fluid impermeable outer surface. The body can be positioned in a bore of an attenuator downstream of a pump outlet. As fluid enters the bore, the body compresses to permit additional displacement of a master cylinder piston.

In a second preferred embodiment, a fluid compensator to accommodate piston displacement of a master cylinder in a vehicular braking system includes a fluid chamber formed between an end wall of a bore mounting a slidable piston in a low pressure accumulator and a seal mounted about the piston. A fluid passageway intersects a side wall of the bore at a predetermined distance away from the end wall. At predetermined positions of the piston, fluid flow out of the fluid chamber is restricted as a suction force from a pump inlet draws the piston against the fluid passageway. In a third preferred embodiment, a fluid compensator is formed in a manner similar to the second embodiment with the inclusion of an undercut provided about an outer surface of the piston. The undercut increases the annular restriction between the piston and the bore at the area where the fluid passageway intersects the side wall.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
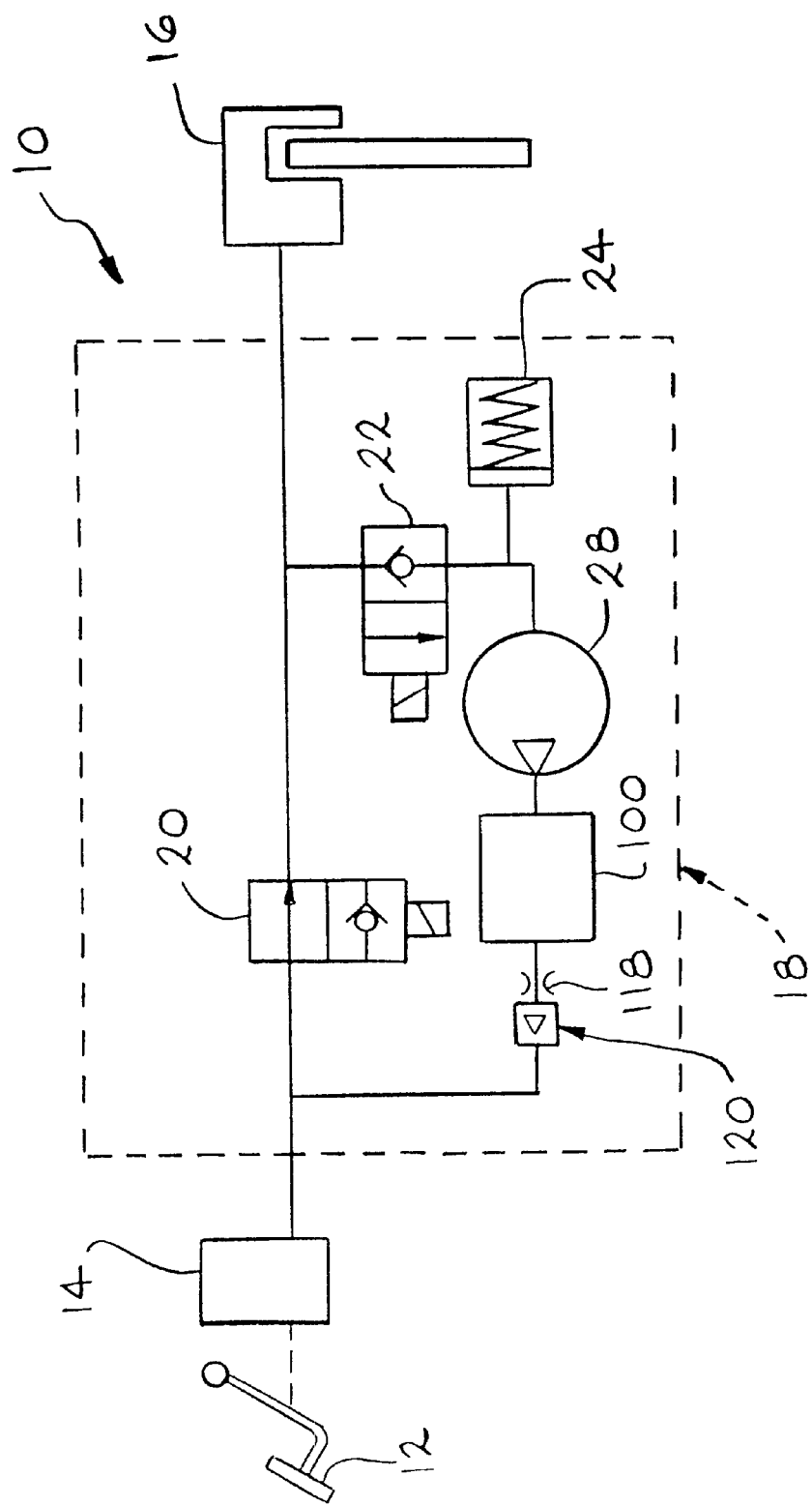
FIG. 1 is a schematic circuit diagram of a vehicular brake system according to this invention illustrating a first embodiment of a fluid compensator provided on a high pressure side of a pump in a hydraulic control unit.

A vehicular brake system according to this invention is indicated generally at 10 in FIG. 1. System 10 includes valves and other components described below to provide anti-lock braking functions. In other embodiments, system 10 can also include components to provide traction control functions and/or vehicle stability control functions.

In system 10, a brake pedal 12 is connected to a master cylinder 14 to provide pressurized brake fluid to a wheel brake 16. In the embodiment prove illustrated in FIG. 1, the wheel brake 16 is illustrated as a disc assembly; however, wheel brake 16 may be any type found on vehicles.

As is well known in the art, the master cylinder 14 includes a piston (not illustrated) which moves in response to application of the brake pedal 12. The master cylinder piston (not illustrated) includes seals (not illustrated) which separate fluid into various chambers in the master cylinder 14. It is known to use lip seals about the master cylinder piston.

A hydraulic control unit (HCU) 18 is a housing having bores for receiving control valves and other components described below. Fluid passageways or conduits are provided between the bores to provide fluid communication between the valves and other components. For purposes of clarity of illustration, only one set of components is illustrated in the schematic of FIG. 1. However, it is understood that the HCU 18 can also house corresponding components for other circuits and/or wheels of the vehicle.

The HCU 18 includes a normally open control valve 20, commonly referred to as an isolation valve, and a normally closed control valve 22, commonly known as a dump valve, disposed between the master cylinder 14 and the wheel brake 16. A low pressure accumulator 24 is disposed between the dump valve 22 and a reciprocating hydraulic pump 26. The pump 26 is driven by an electric motor (not illustrated) in a well known manner. A fluid compensator 100, described in detail below, is provided in the HCU 18 between an outlet of the pump 26 and an inlet to the isolation valve 20. In this position, the fluid compensator 100 can be said to be mounted on a high pressure side of the pump 26.

The isolation valve 20 is preferably formed as a solenoid valve switchable between two positions. The dump valve 22 is preferably formed as a solenoid valve switchable between two positions. Valves 20 and 22, as well as pump 26, are electrically connected to an electronic control module (not illustrated) and operated to provide desired braking in a well known manner.

Figure 2:
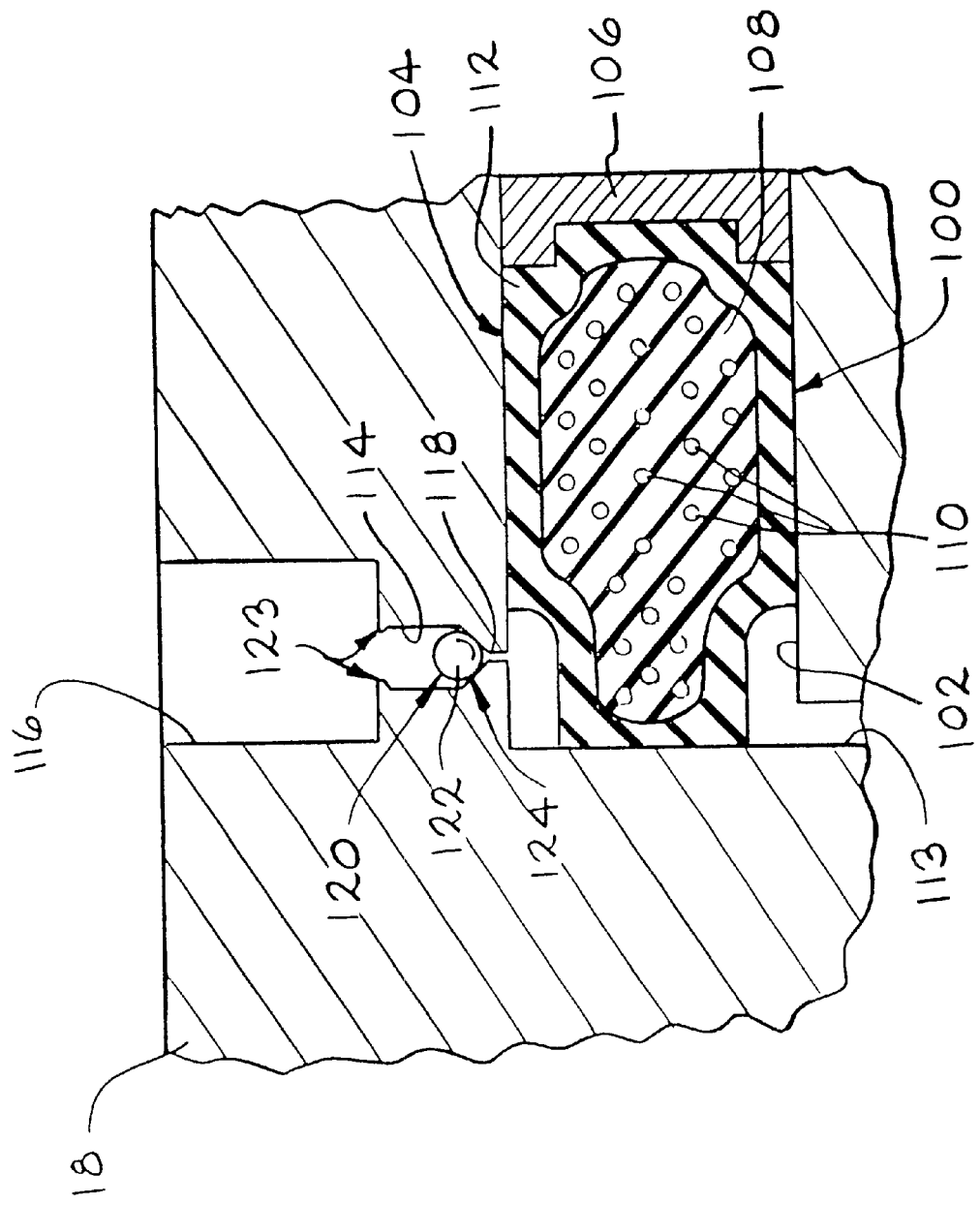
FIG. 2 is a sectional view through the fluid compensator of FIG. 1.

A schematic sectional view of a portion of the HCU 18 is presented in FIG. 2. As stated above, the HCU 18 is formed as a housing containing valves and other components described below. The HCU 18 includes bores for receiving the isolation valve 20, the dump valve 22, the low pressure accumulator 24, and the fluid compensator 100. The fluid compensator 100 accommodates additional displacement of a master cylinder piston (not illustrated) during anti-lock braking only, thereby moving seals of the master cylinder piston away from a compensator port orifice (not illustrated) of the master cylinder 14.

The fluid compensator 100 is mounted in the HCU 18 that can be used with various anti-lock brake systems. A bore 102 is provided in the HCU 18. The bore 102 and its interior volume can be referred to as an attenuator to damp fluid pulses entering the bore 102. A resilient body 104 is fitted within the bore 102. The body 104 is retained within the bore 102 by an end plug 106. The end plug 106 is secured to the HCU 18 by any desired means.

The body 104 can be formed as a molded member having an interior portion 108 having at least one pore or cavity 110. A membrane 112 is provided about the outer surface of the interior portion 108. The membrane 112 is formed from a material that prevents brake fluid from penetrating the porous interior portion 108. The pores 110 are filled with a suitable trapped gas. The interior portion 108 and the membrane 112 are formed from suitable resilient materials.

The body 104 can be formed by a method that utilizes a controlled porosity in a thermal plastic injection molding process. In such a process, closed-cell foaming agents are utilized during an injection process to produce controlled porosity (resulting in pores 110) in the interior portion 108. The pores 110 can be limited in size to provide controlled fluid displacement during ABS mode (to provide the master cylinder seal saver function). Also, porosity effectively reduces the bulk modulus of the body 104, resulting in improved noise damping properties. The body 104 can also be formed by other means that produce a resilient interior portion having trapped gas. For example, a fluid impermeable outer surface of the body 104 can be integrally formed with the interior portion 108 having a lower modulus.

The fluid compensator 100 is preferably located adjacent an outlet 113 of the pump 26 and adjacent an inlet 114 of a passageway 116 which leads to the isolation valve 20 (not illustrated in FIG. 2). Preferably, an end of the body 104 adjacent the outlet 113 is reduced. A restricted orifice 118 is preferably provided between bore 102 and the inlet 114. Preferably, a one-way check valve 120 is provided at the inlet 114. Valve 120 permits fluid flow from the fluid compensator 100 to the isolation valve 20 but not in the opposite direction. The check valve 120 can be formed by a ball 122 retained by cold stakes 123 at one end of the inlet 114. A valve seat 124 is provided in the inlet 114 for seating the ball 122 to prevent fluid from flowing into the restricted orifice 118 from passageway 116.

When system 10 is operating in normal braking (i.e., not an ABS mode), the fluid compensator 100 has no effect on the system 10 as fluid from the master cylinder 14 is checked by the check valve 120. Thus, the fluid compensator 100 does not affect pedal stroke.

When the system 10 is operating in an ABS mode, i.e., when pump 26 is pumping brake fluid, the fluid compensator 100 permits the master cylinder 14 to continue to travel, thereby moving a seal of the master cylinder piston away from a compensator port orifice. As the pump 26 forces fluid into bore 102, body 104 compresses as its pores 110 collapse upon themselves. Thus, additional fluid is stored within the bore 102, and not routed to the master cylinder 14. When the pump 26 stops operating (i.e., when an ABS event is complete), the resilient body 104 expands to its approximate original configuration. The additional fluid that had been stored in the bore 102 is returned to the master cylinder 14.

As stated above, the resilient body 104 also improves noise damping in system 10 as fluid pulses exit the pump 26. The relatively soft interior portion 108 collapses as fluid enters bore 102 from the pump outlet 113.

Figure 3:
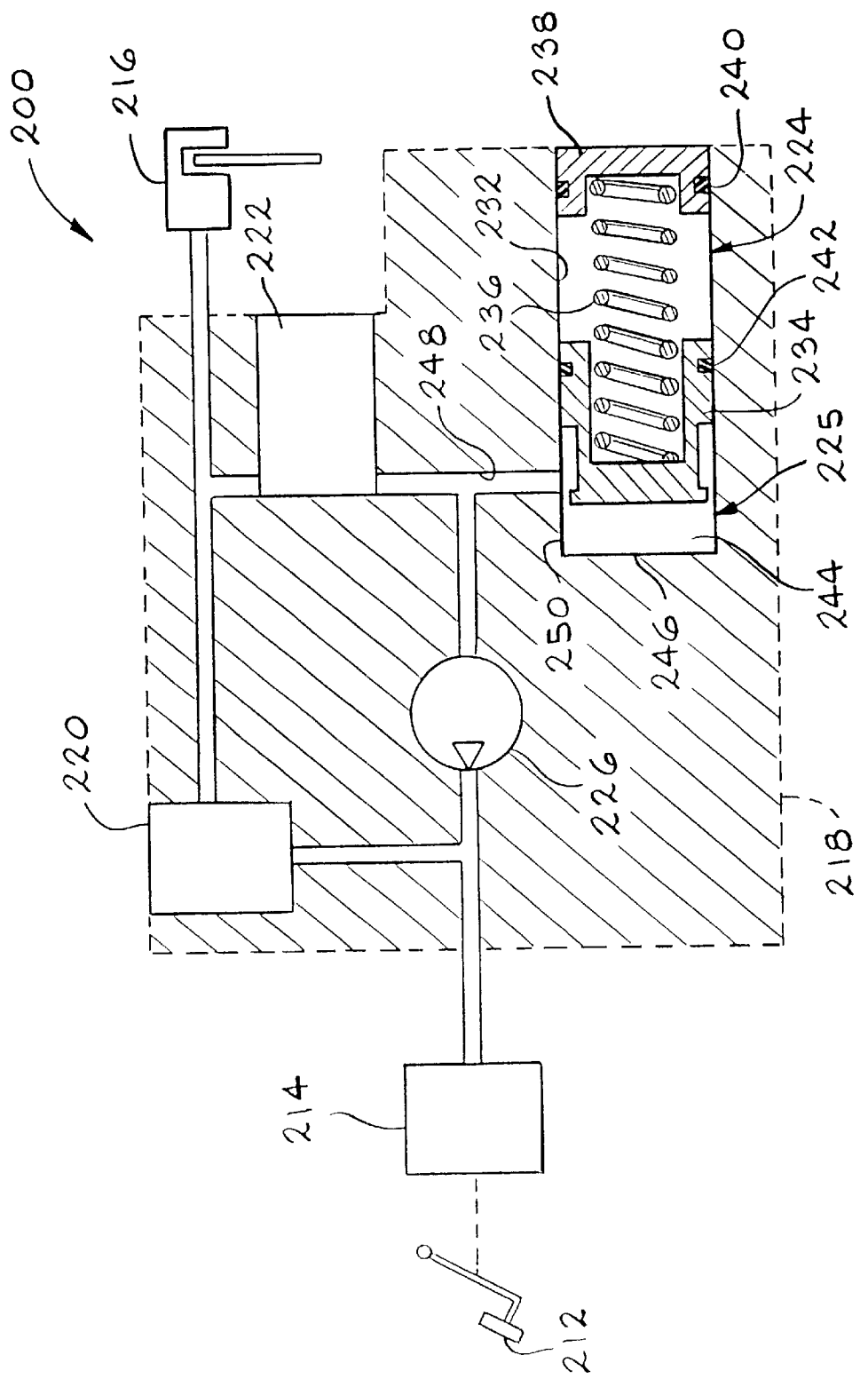
FIG. 3 is a schematic circuit diagram of a vehicular brake system according to this invention illustrating a second embodiment of a fluid compensator provided on a low pressure side of a pump in a hydraulic control unit.

A second embodiment of a vehicular brake system according to this invention is indicated generally at 200 and illustrated in FIG. 3. System 200 includes valves and other components described below to provide an anti-lock braking function. In other embodiments, system 200 can also include components to provide traction control and vehicle stability control functions.

In system 200, a brake pedal 212 is connected to a master cylinder 214 to provide pressurized brake fluid to a wheel brake 216. In the embodiment illustrated in FIG. 3, the wheel brake 216 is illustrated as a disc assembly; however, the wheel brake 216 may be any type found on vehicles.

As is well known in the art, the master cylinder 214 includes a piston (not illustrated) which moves in response to application of the brake pedal 212. The master cylinder piston includes seals that separate fluid into various chambers in the master cylinder 214. It is known to use lip seals about the master cylinder piston.

A hydraulic control unit (HCU) 218 is a housing having bores for receiving control valves and other components described below. Fluid conduits are provided between the bores to provide fluid communication between the valves and other components. For purposes of clarity of illustration, only one set of components is illustrated in the schematic of FIG. 3. However, it is understood that the HCU 218 can also house corresponding components for other circuits and/or wheels of the vehicle.

The HCU 218 includes a normally open control valve 220, commonly referred to as an isolation valve, and a normally closed control valve 222, commonly known as a dump valve, disposed between the master cylinder 214 and the wheel brake 216. A low pressure accumulator (LPA) 224 is disposed between the dump valve 222 and a reciprocating hydraulic pump 226. The pump 226 is driven by an electric motor in a well known manner. As described below, the LPA 224 includes a fluid compensator 225 that improves the operating life of seats mounted on a piston in the master cylinder 214.

The isolation valve 220 is preferably formed as a solenoid valve switchable between two positions. The dump valve 222 is preferably formed as a solenoid valve switchable between two positions. Valves 220 and 222, as well as pump 226, are electrically connected to an electronic control module (not illustrated) and operated to provide desired system braking in a well known manner.

The LPA 224 includes a bore 232 formed in the HCU 218. A cup-shaped piston 234 is slidably mounted in the bore 232. A spring 236 biases the piston 234 away from an end cap 238 that closes the bore 232. The end cap 238 can be retained in any desired manner. A seal 240 is received in a groove formed in an outer surface of the end cap 238 to seal the bore 232. A seal 242 is received in a groove formed in an outer surface of the piston 234.

The fluid compensator 225 includes a fluid chamber 244 formed between an end wall 246 of the bore 232 and seal 242 placed about the piston 234. Fluid is routed to the chamber 244 via a passageway 248 intersecting a side wall 250 of the bore 232. The passageway 248 is spaced a predetermined distance away from the end wall 246. At predetermined positions of the piston 234, the piston 234 restricts fluid flow into and out of the chamber 244. Another predetermined positions of the piston 234, fluid travels freely into and out of the chamber 244 via passageway 248.

Some fluid from the first few dump pulses remains in the chamber 244 during an ABS event. During an ABS event, i.e., when the pump 226 is operating, a suction force to the pump inlet is generated in passageway 248. The suction force is applied against a side of the piston 234 and pulls the piston 234 against the side wall 250, thereby restricting fluid flow through passageway 248, and reducing fluid flow to the pump 226. This feature insures that a predetermined amount of fluid will be delayed (at least until the next dump sequence) in chamber 244 prior to returning to the master cylinder 14 during the remainder of an ABS event. This storage of fluid in the HCU 18 provides a seal saver function for a seal on a master cylinder piston, since the stored fluid does not displace the master cylinder piston.

Once the pump 226 is deactivated, i.e., after an ABS event is completed, piston 234 will recenter in the bore 232, allowing fluid trapped in chamber 244.to drain out over lip seals (not illustrated) in the dump valve 222.

When the system is operating in normal braking (i.e., not an ABS event), the fluid compensator 225 has no effect on the system 200. When the system 200 is operating in an ABS mode, i.e., when pump 226 is operating, the fluid compensator 225 permits a master cylinder piston to travel so that seals will be moved away from compensator ports in the master cylinder 14.

Figure 4:
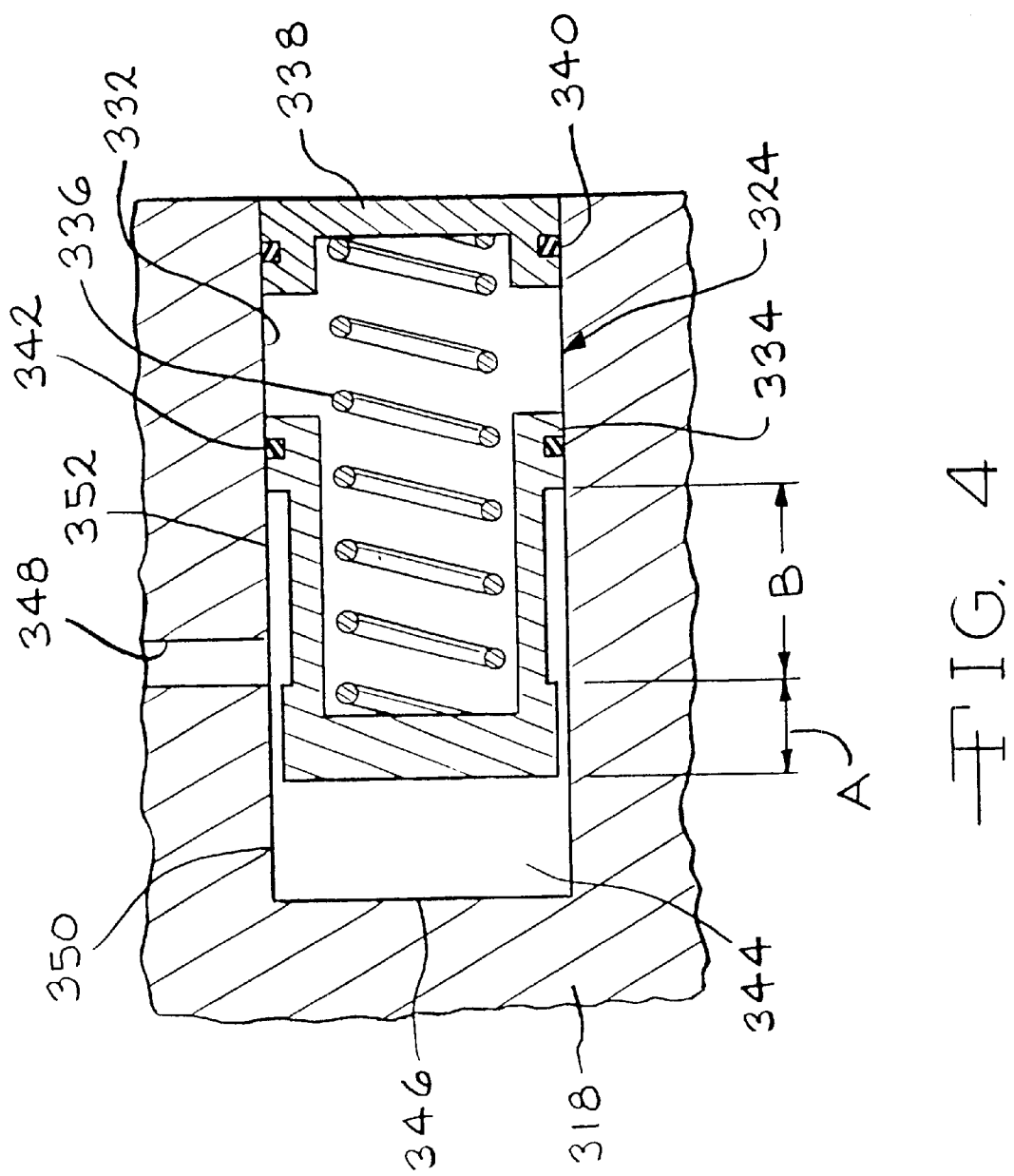
FIG. 4 is a sectional view through a third embodiment of a fluid compensator according to this invention provided on a low pressure side of a pump in a hydraulic control unit.

A third embodiment of a fluid compensator according to this invention is indicated generally at 325 in FIG. 4. A low pressure accumulator (LPA) 324 is disposed between a dump valve (not illustrated) and a reciprocating hydraulic pump (not illustrated) in a hydraulic control unit (HCU) 318 in a manner similar to corresponding elements of system 200 illustrated in FIG. 3. The LPA 324 includes a bore 332 formed in the HCU 318. A cup-shaped piston 334 is slidably mounted in the bore 332. A spring 336 biases the piston 334 away from an end cap 338 that closes the bore 332. The end cap 338 can be retained onto the HCU 318 in any desired manner. A seal 340 is received in a groove formed in an outer surface of the end cap 338 to seal the bore 332. A seal 342 is received in a groove formed in an outer surface of the piston 334.

The fluid compensator 325 includes a fluid chamber 344 formed between an end wall 346 of the bore 332 and the seal 342 placed about the piston 334. Fluid is routed to the chamber 344 via a passageway 348 intersecting a side wall 350 of the bore 332. The passageway 348 is spaced a predetermined distance away from the end wall 346. At predetermined positions of the piston 334, fluid is restricted from entering and exiting in the chamber 344. At other predetermined positions of the piston 334, fluid travels freely into and out of the chamber 344 via passageway 348.

An undercut or groove 352 is provided in an outer surface of the piston 334. Preferably, the undercut 352 is formed along a portion of the length of the piston 334 spanning the distance indicated at B in FIG. 4. The undercut 352 is formed between a portion of the length of the piston 334 indicated at A and between a portion of the piston 334 mounting seal 342.

The undercut 352 improves the first dump performance by reducing the annular restriction between the piston 324 and the bore 332. The time to drain fluid trapped in chamber 344 at the end of an ABS event is reduced by minimizing the length of surface A and by maximizing the length of surface B.

When a brake system is operating in normal braking (i.e., not an ABS event), the fluid compensator 325 has no effect on the system. When the system is operating in an ABS mode, i.e., when a pump operating, the fluid compensator 325 permits a master cylinder piston to travel so that seals will be moved away from compensator port orifices in the master cylinder.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A hydraulic control unit of an electronically controlled vehicular brake system comprising:
   a housing including a bore having an end wall and a side wall;
   a pump having an inlet and an outlet mounted on the housing;
   a fluid passageway formed in the housing between the inlet of the pump and the side wall of the bore;
   a slidable piston provided in the bore; and
   a fluid compensator to accommodate travel of a master cylinder piston, the fluid compensator including a fluid chamber formed between the end wall of the bore and the piston of the hydraulic control unit, wherein operation of the pump causes the piston to move to a position where the piston restricts fluid flow from the fluid chamber to the fluid passageway, and deactivation of the pump after operation causes the piston to move to a position where the piston does not restrict fluid flow from the fluid chamber to the fluid passageway.

2. The hydraulic control unit defined in claim 1 wherein the piston includes an undercut in its outer surface which is in fluid communication with the passageway in the side wall of the bore during predetermined positions of the piston.

3. The hydraulic control unit defined in claim 1 wherein the passageway is spaced a predetermined distance from the end wall of the bore.

4. The hydraulic control unit defined in claim 1 herein the fluid passageway does not include a valve.

5. The hydraulic control unit defined in claim 1 further comprising an isolation valve mounted on the housing, and a second fluid passageway formed in the housing and connecting the bore to the isolation valve.

6. A fluid compensator assembly to accommodate travel of a master cylinder piston in an anti-lock braking system, the fluid compensator assembly comprising:

a hydraulic control unit mounting a pump having an inlet and an outlet; and a low pressure accumulator having a slidable piston provided in a bore, the bore having an end wall and a side wall, a fluid chamber being formed between the end wall of the bore and the piston, and a fluid passageway being formed in the side wall of the bore, the fluid passageway being connected to the inlet of the pump, wherein operation of the pump causes the piston to move to a position where the piston restricts fluid flow from the fluid chamber to the fluid passageway, and deactivation of the pump after operation causes the piston to move to a position where the piston does not restrict fluid flow from the fluid chamber to the fluid passageway.

7. The fluid compensator defined in claim 6 wherein the piston includes an undercut in its outer surface which is in fluid communication with the passageway in the side wall of the bore during predetermined positions of the piston.

8. The fluid compensator defined in claim 7 wherein the undercut is formed between an end portion of the piston having a length A and a portion of the piston sealingly engaged with the bore, wherein the undercut has a length B, and wherein the time to drain fluid from the fluid chamber after the pump is deactivated can be adjusted by adjusting the length A relative to the length B.

9. The hydraulic control unit defined in claim 2 wherein the undercut is formed between an end portion of the piston having a length A and a portion of the piston sealingly engaged with the bore, wherein the undercut has a length B, and wherein the time to drain fluid from the fluid chamber after the pump is deactivated can be adjusted by adjusting the length A relative to the length B.

10. A fluid compensator assembly comprising:

a housing mounting a pump having an inlet and an outlet, the housing having an inner surface defining a first end wall, a second end wall and a cylindrical side wall extending axially between the first end wall and the second end wall, the side wall, the first end wall and the second end wall cooperating to define a cylindrical cavity in said housing, the side wall defining an opening therein at a point spaced apart from the first end wall by a first distance and spaced apart from the second end wall, the housing further defining a fluid passageway in the housing, the fluid passageway communicating at a first end with the cavity through the opening defined in the side wall, the fluid passageway connecting to the inlet of the pump;

a piston disposed for movement in the cavity and circumferentially sealingly engaging the side wall at a first portion of the piston, the piston defining a reduced diameter axial extension forming a second portion of the piston, a generally annular gap being defined between the second portion of the piston and the side wall, a shoulder being defined between the first portion of the piston and the reduced diameter second portion of the piston, the axial extension extending a second distance, greater than the first distance, from the shoulder to an end of the axial extension of the piston that is a part of the piston closest to the first end wall of the cavity; and a spring disposed in the cavity, the spring urging the piston toward the first end wall of the cavity.

11. The fluid compensator assembly defined in claim 10, wherein the piston further defines a circumferentially extending groove about an outer surface of the first portion of the piston, and further comprising a seal disposed in the groove for movement with the piston, the seal engaging both the piston and the side wall of the cavity to seal therebetween.

12. The fluid compensator assembly defined in claim 10, wherein the axial extension of the piston further defines a third portion of the piston adjacent the end of the axial extension that is the part of the piston closest to the first end wall of the cavity, the third portion having a diameter less than the diameter of the first portion of the piston and having a diameter greater than the diameter of the second portion of the piston, a second generally annular gap being defined between the third portion of the piston and the side wall of the cavity having a gap width less than the gap width of the annular gap defined between the second portion of the piston and the side wall.

13. The fluid compensator assembly defined in claim 10, wherein the spring is seated on the second end wall of the cavity and on the piston.

* * * * *